R. FLANIGAN.

CLOSURE FOR BOTTLES.

No. 11,629. Reissued Sept. 14, 1897.

Witnesses.

J. F. Coleman

Archie G. Rice

Inventor.

Robert Flanigan by Frank L. Dyer

Attorney.

UNITED STATES PATENT OFFICE.

ROBERT FLANIGAN, OF BALTIMORE, MARYLAND, ASSIGNOR OF FIVE-EIGHTHS TO J. S. DETERICK, OF SAME PLACE, AND FRANK L. DYER, OF WASHINGTON, DISTRICT OF COLUMBIA.

CLOSURE FOR BOTTLES.

SPECIFICATION forming part of Reissued Letters Patent No. 11,629, dated September 14, 1897.

Original No. 521,788, dated June 26, 1894. Application for reissue filed May 3, 1897. Serial No. 634,942.

*To all whom it may concern:*

Be it known that I, ROBERT FLANIGAN, of the city of Baltimore, in the State of Maryland, have invented certain new and useful Improvements in Closures for Bottles; and I do hereby declare the following to be a full, clear, and exact description of the same, reference being had to the accompanying drawings, forming a part of this specification, and to the letters of reference marked thereon.

This invention relates to that class of closures adapted more especially for use on bottled beer and beverages, in the consuming of which the closure is usually destroyed or removed and lost, while the bottle is preserved, and hence it becomes highly desirable to provide a very simple and cheap closure, but one which will at the same time form a secure and tight fastening.

The invention consists in certain novel details of construction and combinations and arrangements of parts, all as will be now described, and pointed out specifically in the appended claims.

It has been heretofore proposed to employ a bottle having a suitable lip-flange or annular enlargement around the mouth with a cap adapted to fit over the mouth of said bottle and around the enlargement, the downwardly-extending portion of the cap being crimped to form inwardly-extending projections for coöperation with the enlargement to hold the cap in place and a disk of sealing material, such as cork, being placed within the cap to form an air-tight closure. Such devices in actual use have been found inefficient, the difficulties being due to the fact that there is little if any latitude for inequalities in the conformation of the bottle-mouth and enlargement, thus making it impossible to fit the closure accurately, especially as it is found to be practically impossible to obtain bottles which are strictly accurate and uniform in their conformation. A further objection to such caps is that they necessitate the employment of a special tool for applying the caps in place by bending the flange inwardly and clamping the same on the bottle-neck.

One of the main objects of my invention is to overcome this objection and, further, to provide for the use of the closure upon bottles differing slightly in size.

Figure 1:
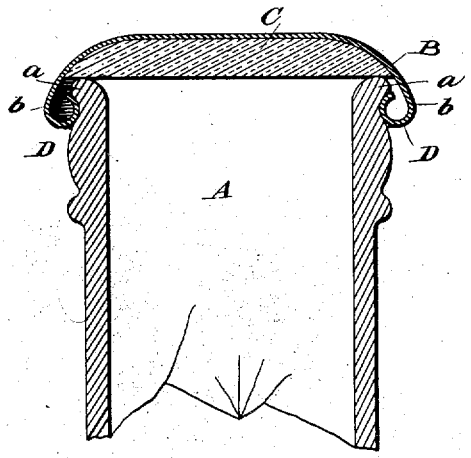
Figure 2:
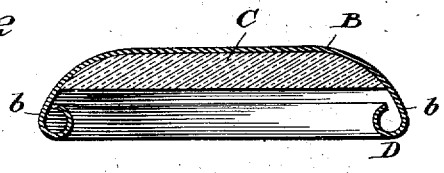
Figure 3:
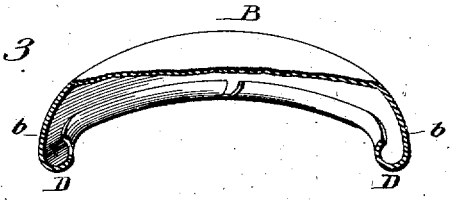

Referring to the accompanying drawings, Figure 1 is a vertical section through a bottle and closure constructed in accordance with my invention. Fig. 2 is an enlarged detail section through the closure itself; Fig. 3, a detail perspective showing the bead slitted to provide for a wider range of elasticity than can be secured with the construction illustrated in Figs. 1 and 2; and Fig. 4, a perspective view of a closure, showing the bead and flange cut vertically to provide a wider range of elasticity than can be secured with the construction illustrated in Fig. 3.

Like letters of reference in the several figures indicate the same parts.

The bottle A in the accompanying drawings, it is obvious, may be of any of the ordinary or of any preferred form, it only being essential that it be provided with a lip-flange or enlargement *a* on the outside near the mouth, or that it be so conformed at this point as to afford an undercut bearing-surface, beneath which the closure may automatically grip.

Figure 4:
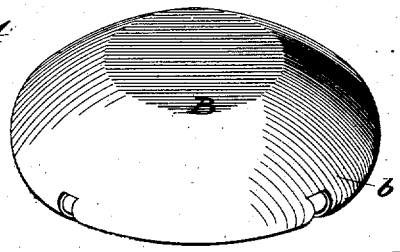

A cap B, preferably struck up from resilient sheet metal, is provided for fitting over the mouth of the bottle, and within it there is located a sealing diaphragm or washer C, of cork or similar somewhat elastic substance, which will form a water and air tight closure by being pressed against the mouth of the bottle. The downwardly-flanged portion of the cap (lettered *b*) is at the lower edge beaded, the flange being turned inward and then outward to a point in proximity to but not touching the inner surface of the part *b*. The effect of this is to form an inwardly-turned opened bead D, which constitutes a gripping-ledge adapted to coöperate with the undercut of the lip-flange on the bottle and automatically retain the cap in position. By beading the downwardly-extending portion or flange of the cap, with the edge of the bead in proximity to but not touching the part *b*, it will be seen that I am enabled to secure a somewhat elastic bearing against the enlargement on the bottle, and hence it is not absolutely necessary to slit or break the continuity of the flange or bead at all, although it is desirable in some instances to do so, as illustrated in Figs. 3 and 4. The rounded inner surface of the bead coöperates with the rounded undercut of the projection on the bottle and forms a long "drawing-surface," so to speak—that is to say, as the smallest diameter of the bead passes the largest diameter of the projection on the bottle the elasticity of the bead will cause the same to contract, and in doing so will automatically draw the body of the cap down, and the tendency at all times will be to hold the cap tightly in place, whereby I dispense with the employment of tools for compressing the flange and bending the same into contact with the bottle-neck, as is necessary with prior caps. Where it is desirable to have a greater range of lateral elasticity, the body of the flange as well as the bead may be cut vertically, as illustrated in Fig. 4, or the bead alone may be slitted or cut, as illustrated in Fig. 3. The former form gives a somewhat greater range of vertical elasticity and enables the device to conform more readily to inequalities in the vertical thickness of the lip-flange or of the sealing-disk located within the cap as well as a wider range of elasticity in a lateral direction. The solid downwardly-extending flange affords a firm support and limits the movement of the beaded portion so as to prevent any undue strain or setting of the metal constituting the bead, which at all times remains approximately circular in cross-section, since a compressing-tool is not used for clamping the flange in place.

The whole device, it will be seen, is extremely simple, and use demonstrates the fact that it will form an exceedingly strong closure, is not liable to leak or be knocked off by accident or otherwise in use, besides having the advantage of not requiring the use of tools for compressing the cap onto the bottle-neck, as heretofore.

Having thus described my invention, what I claim as new is—

1. The combination with the bottle having the undercut near its mouth, of the integral metallic resilient cap having the downwardly-extending flange fitting around the bottle-mouth, and turned back upon itself at its lower edge to form a hollow bead, at all times approximately circular in cross-section, rounded on its inner surface, automatically coöperating with the undercut in the bottle, and the sealing-disk within the cap, substantially as described.

2. The combination with the bottle having the undercut near its mouth, of the integral metallic resilient cap having the downwardly-extending flange, fitting around the bottle-mouth with the inwardly-beaded lower edge automatically coöperating with the undercut on the bottle, the upwardly-extending edge of said beaded portion being turned out, into proximity to, but not in contact with the inner surface of the body of the flange, said bead at all times being approximately circular in cross-section, and the sealing-disk in said cap, substantially as described.

3. A closure for bottles consisting of the integral metallic resilient cap having the downwardly-extending flange formed with a hollow bead at its lower edge, the beaded portion formed with a rounded inner surface and being slitted vertically to provide for a greater range of elasticity, said bead at all times being approximately circular in cross-section, and the sealing-disk within said cap; substantially as described.

4. A closure for bottles consisting of the integral metallic resilient cap having the downwardly-extending flange with the inwardly-beaded lower edge, the upwardly-extending edge of said beaded portion being turned out into proximity to, but not in contact with, the surface of the body of the flange, and said bead at all times being approximately circular in cross-section, substantially as described.

This specification signed and witnessed this 29th day of March, A. D. 1897.

ROBERT FLANIGAN.

Witnesses:
FRANK L. DYER,
ARCHIE G. REESE.